March 11, 1969    F. LE COZ ETAL    3,431,618
DEVICE FOR ASSEMBLING A NUCLEAR FUEL ELEMENT SUPPORT INSIDE
AN ANNULAR SLEEVE
Filed March 14, 1966
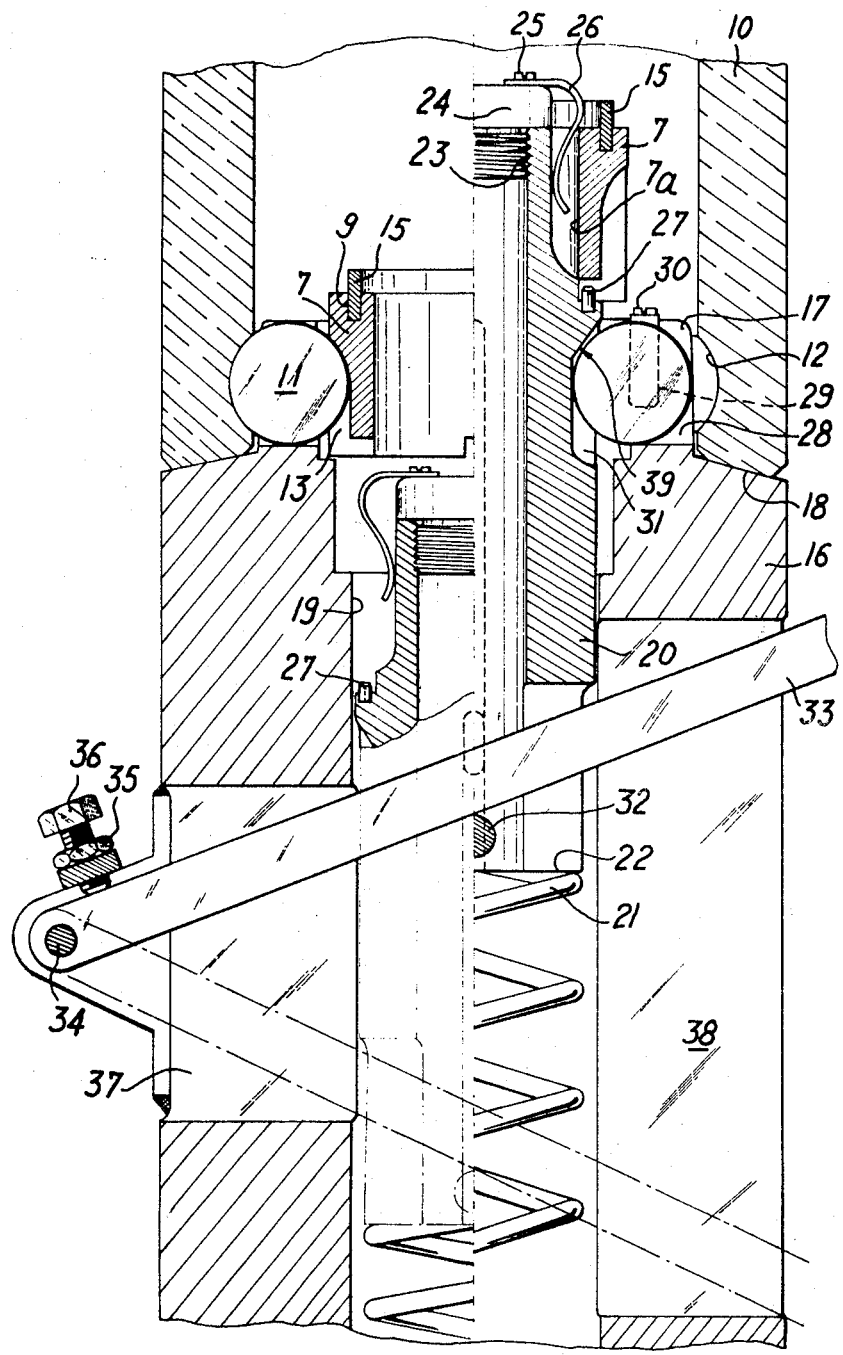

United States Patent Office 3,431,618
Patented Mar. 11, 1969

3,431,618
DEVICE FOR ASSEMBLING A NUCLEAR FUEL ELEMENT SUPPORT INSIDE AN ANNULAR SLEEVE
Francois Le Coz, Issy-les-Moulineaux, René Mombazet, Arpajon, and Noël Raynaud, Fontenay-aux-Roses, France, assignors to Commissariat a l'Energie Atomique, Paris, France
Filed Mar. 14, 1966, Ser. No. 533,887
Claims priority, application France, Mar. 30, 1965, 11,187
U.S. Cl. 29—200
Int. Cl. B23p 19/04
6 Claims This invention relates to a device for assembling a nuclear fuel element support within an annular sleeve, a support of this type being made up in particular of a bracket of generally cylindrical shape on which the base of the fuel element rests and at least three discs which are uniformly spaced around the axis of the fuel element and engaged on the one hand in a toric groove formed in the internal surface of the sleeve and on the other hand in recesses formed in the cylindrical support bracket, said discs being held in position under the action of the pressure which is exerted on said support bracket by the weight of the fuel element.

A support of this type which serves to maintain fuel elements in a vertical position within the channels of a nuclear reactor has already been described and illustrated in French application No. 6,320, filed Feb. 19, 1965. In this application, the example of construction which is more especially considered makes use of discs having the shape of flat cylindrical pastilles which are engaged in vertical slots machined in the cylindrical support bracket, so that the planes of the different discs pass through the axis of the sleeve and of the fuel element which is placed at the center of said sleeve.

This invention relates to a device for the simple and automatic assembly of a support of this type and especially a cylindrical support bracket and discs inside the sleeve without any direct manipulation on the part of the operator, thereby facilitating production-line manufacture.

The device referred-to is characterized in that is comprises a hollow cylindrical body over which the lower end of the annular sleeve is adapted to engage to a partial extent, a moving plunger which is guided axially within said hollow body and within said sleeve and the head of which carries the cylindrical support bracket by means of blade springs, the hollow body being provided at the upper end which penetrates into the sleeve with slots for the positioning of the discs which are held in position by means of other blade springs opposite to the toric groove of the sleeve, said discs being adapted to cooperate with an inclined ramp formed in the plunger in such a manner that the downward displacement of said plunger initiates the engagement of the discs on the one hand in the groove of the sleeve and on the other hand in the recesses of the cylindrical support bracket so as to free said bracket from the plunger head.

In a preferred form of embodiment of the invention, the control of the displacement of the plunger within the hollow body is carried out by means of a lever which is pivoted about a stationary pin in a vertical plane, said lever being adapted to traverse the hollow body through lateral slots and to cooperate with a transverse locking-pin which is integral with the plunger. In addition, and in accordance with another characteristic feature, the plunger is continuously subjected to the action of a restoring spring which tends to maintain said plunger in the top position in opposition to the movement produced by the lever.

Aside from these main characteristic features, the assembly device in accordance with the invention is endowed with a certain number of secondary features, particularly in regard to the presence of centering studs carried by the plunger for the purpose of fixing the positions of the recesses of the cylindrical support bracket with respect to the discs and also in regard to the utilization of an adjustable stop which is integral with the hollow body for the purpose of limiting the displacements of the lever and consequently of the plunger.

All of these characteristics will become more readily apparent from a perusal of one example of construction which is given solely by way of indication and not in any limiting sense, with a view to illustrating one mode of practical application of the present invention.

In the accompanying drawings, the single figure is a diagrammatic vertical sectional view of the assembly device considered, on the right-hand side of which is shown the moving plunger in the top position prior to assembly of the discs, of the cylindrical support bracket and of the sleeve and on the left-hand side of which is shown the plunger in the bottom position after the assembly of the different components referred to above has been completed.

As can be seen from the figure, the device which is proposed is intended to permit the assembly, within an annular sleeve 10 which is formed in particular of graphite, of a cylindrical support bracket 7 which can also be formed of graphite and so designed as to support a fuel element (not shown in the figure) by means of a ring 15 which is placed within a circular groove 9 of said cylindrical support bracket, said fuel element being intended to be maintained in the vertical position along the axis of the sleeve 10. The coupling between the cylindrical support bracket 7 and the sleeve 10 is provided by means of discs such as the disc 11 which are four in number in the example of construction herein described. These discs, which are preferably designed in the form of flat cylindrical pastilles, are adapted to engage on the one hand inside a toric groove 12 formed at the vase of the sleeve 10 and, on the other hand, in vertical slots or recesses 13 machined in the cylindrical support bracket 7 itself.

In accordance with the invention, the assembly device employed comprises a cylindrical body 16 placed on a base (not shown) and having an extension at the top portion thereof in the form of a rim 17 of smaller cross-section in such a manner that the graphite sleeve 10 is capable of fitting over said rim 17 and resting against the bearing surface 18 of the body 16, both sleeve and body being under these conditions disposed in coaxial relation in the vertical position. The body 16 is pierced axially by a bore 19, within which is mounted a plunger 20 which is continuously subjected to the action of an oppositely acting spring 21 which is applied against the underface 22 of the plunger and which tends to thrust this latter upwards. Said plunger is provided at the top with a threaded portion 23 onto which is screwed a head or plug 24. Blade springs 26 are attached to said head by means of screws 25 and serve, as shown on the right-hand side of the figure, to maintain the cylindrical support bracket 7 on the plunger 20 which passes through the hollow central portion 7a of said support bracket. Studs such as 27 serve to provide suitable centering of the cylindrical support bracket relatively to the plunger so as to ensure that the discs 11 engage correctly within the recesses 13 of the support bracket, as will be explained later.

Said discs 11 are placed within slots 28 which are formed at uniform intervals in the rim 17 of the hollow body 16 and are maintained in position by other blade springs 29 which are secured against the body by means of screws 30. As can be seen in the right-hand portion of the figure, the blade springs 26 and 29 thus serve to maintain respectively on the one hand the cylindrical support bracket 7 and on the other hand the discs 11 against the plunger 20 and against the hollow body 16, the discs 11 being located opposite to the toric groove 12 which is formed at the base of the sleeve 10 and penetrate to a slight extent in the plunger 20 within grooves such as the groove 31 which are suitably formed in said plunger.

The lower end of the plunger 20 is fitted with a transverse locking-pin 32 which is intended to cooperate with an operating lever 33, said lever being pivoted about a pin 34 which is stationary with respect to the hollow body 16. A stop 35 which is adjustable by means of a screw 36 limits the top position of the lever 33 and consequently of the plunger 20 which is applied against the lever by means of the locking-pin 32 under the action of the spring 21. The lever 33 traverses the hollow body 16 and can be subjected within this latter to a movement of angular displacement in a vertical plane within slots 37 and 38.

The operation of the device which has just been described is as follows:

In a first stage, the plunger 20 is in the top position as shown in the right-hand portion of the figure, the lever 33 being shown in full lines in this position. The cylindrical support bracket 7 is placed on the plunger head and centered with respect to this latter by means of the studs 27 whilst the discs 11 are set in position within their slots of the portion 17 of the body 16 and maintained by the springs 29. The sleeve 10 is then fitted over the rim 17.

In a second stage, the lever 33 is lowered so as to bring it into the position shown in chain-dotted lines. During this movement, the discs 11 move towards the interior of the groove 12 which is formed in the sleeve 10 under the action of the ramps 39 which are machined in the top portions of the grooves 31 of the plunger whilst the cylindrical support bracket 7 moves vertically downward and its recesses completely cover the discs when these latter are in the position shown in the left-hand portion of the figure. The support unit which is formed by the bracket 7, the discs 11 and the sleeve 10 is then perfectly assembled, which accordingly makes it possible to carry out its removal. The return of the plunger to its initial position then takes place simply under the action of the spring 21 which returns said plunger to its top position. Another assembly operation for a fresh cylindrical support bracket and a fresh sleeve can then be carried out.

As will be readily understood, the invention is not limited in any sense to the form of embodiment which has been described herein with reference to the accompanying drawings and which has been given solely by way of example.

What we claim is:

1. Device for assembling a nuclear fuel element support within an annular sleeve, said support being made up of a bracket having a generally cylindrical shape on which the base of the fuel element rests and at least three discs which are uniformly spaced around the axis of the fuel element an engaged on the one hand in a toric groove formed in the internal surface of the sleeve and on the other hand in recesses formed in the cylindrical support bracket, said discs being held in position under the action of the pressure which is exerted on said support bracket by the weight of the fuel element, characterized in that it comprises a cylindrical hollow body over which the lower end of the annular sleeve is adapted to engage to a partial extent, a moving plunger which is guided axially within said hollow body and within said sleeve and the head of which carries the cylindrical support bracket by means of blade springs, the hollow body being provided at the upper end which penetrates into the sleeve with slots for the positioning of the discs which are held in position by means of other blade springs opposite to the toric groove of the sleeve, said discs being adapted to cooperate with an inclined ramp formed in the plunger in such a manner that the downward displacement of said plunger initiates the engagement of the discs on the one hand in the groove of the sleeve and on the other hand in the recesses of the cylindrical support bracket so as to free said bracket from the plunger head.

2. Device in accordance with claim 1, characterized in that the control of the displacement of the plunger within the hollow body is carried out by means of a lever which is pivoted about a pin in a vertical plane, said lever being adapted to traverse the hollow body through lateral slots and to cooperate with a transverse locking-pin which is integral with the plunger.

3. Device in accordance with claim 1, characterized in that the plunger is continuously subjected to the action of a restoring spring which tends to maintain it in the top position in opposition to the movement produced by the lever.

4. Device in accordance with Claim 1, characterized in that centering studs carried by the plunger fix the positions of the recesses of the cylindrical support bracket with respect to the discs.

5. Device in accordance with claim 1, characterized in that an adjustable stop which is integral with the hollow body is provided for the purpose of limiting the displacements of the lever and of the plunger.

6. Device for mounting a nuclear fuel element support within an annular sleeve as defined in claim 1, substantially as hereinbefore described with reference to and as illustrated in the accompanying drawings.

References Cited

UNITED STATES PATENTS

| 2,975,662 | 3/1961 | Courtot | 29—200 |
| 3,075,283 | 1/1963 | Jansch | 29—267 X |
| 3,286,988 | 11/1966 | Du Faur | 29—267 X |

FOREIGN PATENTS

| 1,189,219 | 3/1959 | France. |
| 1,305,489 | 8/1962 | France. |
| 1,370,199 | 7/1964 | France. |

THOMAS H. EAGER, *Primary Examiner.*

U.S. Cl. X.R.

29—267, 400